(12) United States Patent
Yin et al.

(10) Patent No.: US 11,387,544 B2
(45) Date of Patent: Jul. 12, 2022

(54) SIGNAL TRANSMISSION DEVICE AND SMART TV

(71) Applicant: SHENZHEN TCL NEW TECHNOLOGY CO., LTD., Guangdong (CN)

(72) Inventors: Liuzhong Yin, Guangdong (CN); Kangqing Guo, Guangdong (CN); Renli Xie, Guangdong (CN); Zitong Wang, Guangdong (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 132 days.

(21) Appl. No.: 16/760,467

(22) PCT Filed: May 22, 2019

(86) PCT No.: PCT/CN2019/088015
§ 371 (c)(1),
(2) Date: Apr. 30, 2020

(87) PCT Pub. No.: WO2020/019842
PCT Pub. Date: Jan. 30, 2020

(65) Prior Publication Data
US 2020/0350659 A1    Nov. 5, 2020

(30) Foreign Application Priority Data
Jul. 23, 2018  (CN) .......................... 201810815054.1

(51) Int. Cl.
*H01Q 1/22* (2006.01)
*H01Q 1/24* (2006.01)
(Continued)

(52) U.S. Cl.
CPC .................. *H01Q 1/24* (2013.01); *H01Q 1/22* (2013.01); *H01Q 1/2283* (2013.01); *H01Q 9/04* (2013.01);
(Continued)

(58) Field of Classification Search
CPC ...... H01Q 1/24; H01Q 1/2283; H01Q 9/0407; H01Q 21/29; H01Q 1/22; H01Q 9/04; H04N 5/38; H04N 5/64; H04W 24/02
(Continued)

(56) References Cited

U.S. PATENT DOCUMENTS 7,825,810 B2   11/2010   Sakama et al.
8,027,636 B2    9/2011   DeMarco et al.
(Continued)

FOREIGN PATENT DOCUMENTS

| CN | 101087040 A | 12/2007 |
| CN | 101507050 A | 8/2009 |

(Continued)

OTHER PUBLICATIONS

Search report of counterpart European Patent Application No. 19841321.3 dated Feb. 2, 2021.
(Continued)

*Primary Examiner* — Hai V Tran
(74) *Attorney, Agent, or Firm* — Menachem Nathan; Nathan & Associates

(57) ABSTRACT

Disclosed are a signal transmission device and a smart TV including a wireless signal module. The signal transmission device includes: a main antenna having a first signal input port, the first signal input port being connected with the wireless signal module; a transmission antenna adjacent to and spaced from the main antenna, the transmission antenna having a signal output port; and a dead-zone compensating antenna having a second signal input port. The second signal
(Continued)

input port is connected with the signal output port through a signal transmission line, and the main antenna receives signals input by the wireless signal module and transmits the signals, the transmission antenna receives a part of the signals and transmits the part of the signals to a dead-zone compensating antenna through the signal transmission line; the dead-zone compensating antenna transmits the received signals and compensates a signal dead zone of the main antenna.

19 Claims, 3 Drawing Sheets

(51) Int. Cl.
    *H01Q 9/04* (2006.01)
    *H04N 5/38* (2006.01)
    *H04N 5/64* (2006.01)
    *H04W 24/02* (2009.01)
    *H01Q 21/29* (2006.01)

(52) U.S. Cl.
    CPC ........... *H01Q 9/0407* (2013.01); *H01Q 21/29* (2013.01); *H04N 5/38* (2013.01); *H04N 5/64* (2013.01); *H04W 24/02* (2013.01)

(58) Field of Classification Search
    USPC .................................................. 343/700 MS
    See application file for complete search history.

(56) References Cited

U.S. PATENT DOCUMENTS

| | | | |
|---|---|---|---|
| 11,150,736 B2 | 10/2021 | de Paz et al. | |
| 2010/0253583 A1* | 10/2010 | Furutani | H01Q 9/0407 343/702 |
| 2012/0108190 A1* | 5/2012 | Mo | H04B 1/3888 455/128 |
| 2014/0127989 A1 | 5/2014 | Judd et al. | |
| 2017/0288293 A1 | 10/2017 | Miller et al. | |
| 2017/0365914 A1* | 12/2017 | Hong | H04B 1/0064 |
| 2018/0059846 A1 | 3/2018 | Tada et al. | |
| 2019/0149871 A1 | 5/2019 | Yoshizawa et al. | |

FOREIGN PATENT DOCUMENTS

| | | |
|---|---|---|
| CN | 201328156 Y | 10/2009 |
| CN | 102760943 A | 10/2012 |
| CN | 102811323 A | 12/2012 |
| CN | 106329072 A | 1/2017 |
| CN | 206293603 U | 6/2017 |
| CN | 107548073 A | 1/2018 |
| CN | 107895838 A | 4/2018 |
| EP | 2081256 A1 | 7/2009 |
| EP | 3183774 | 6/2017 |
| JP | 3-133220 A | 6/1991 |
| JP | 2001313507 A | 11/2001 |
| JP | 2003309738 A | 10/2003 |
| JP | 2006-140578 A | 6/2006 |
| JP | 2008-123231 A | 5/2008 |
| JP | 2010-288058 A | 12/2010 |
| JP | 2015-187778 A | 10/2015 |
| JP | 2015-529870 A | 10/2015 |
| WO | 2016185834 A1 | 11/2016 |
| WO | 2018051469 A1 | 3/2018 |

OTHER PUBLICATIONS

Minggao Zhou et al., Wuxi Mobile TV Patch Coverage, Cable Television Technology, Nov. 20, 2013, Issue 10, pp. 41-42 and 45.
1st Office Action dated May 25, 2021, for Shenzhen TCL New Technology Co., Ltd., Japan Application No. 2020-547279 filed on May 22, 2019.
International Search Report of PCT Patent Application No. PCT/CN2019/088015 dated Aug. 16, 2019.
2nd Office Action dated Nov. 9, 2021, for Shenzhen TCL New Technology Co., Ltd., Japan Application No. 2020-547279 filed on May 22, 2019.

\* cited by examiner

SIGNAL TRANSMISSION DEVICE AND SMART TV

CROSS REFERENCE TO RELATED APPLICATION

The present disclosure is the national stage of international application of PCT/CN2019/088015, which claims the priority of a Chinese patent application No. 201810815054.1 filed July 23, 2018, with the application name "Signal transmission device and smart TV", the entire contents of which are hereby incorporated by reference.

TECHNICAL FIELD

The present disclosure relates to the technical field of communication, in particular to a signal transmission device and a smart TV.

BACKGROUND

The wireless transmission technology has been increasingly applied to smart TV, providing convenience for users. However, dead zones are unavoidable during the signal transmission when Bluetooth is applied for human-computer interaction and other signal transmission devices including MIMO for TV signal transmission, especially under the condition that the TV screens are currently increasing in size, and the TV has complex metals inside. In these dead zones, wireless transmission is poor, as the Bluetooth communication is not available of signal transmission, and WIFI connection is blocked. Various conditions, including the reflection of electromagnetic signals by metals, constrains the research in the related field and no resolution has been found.

The current solution is to change the position of the module antenna frequently, testing and comparing the signal transmission in order to find the best position for signal transmission. And still there is no visual electromagnetic field analysis and simulation, little can be done for the final signal dead zone or dead corners.

SUMMARY

The present disclosure is to provide a signal transmission device, to realize a full coverage of signals.

In order to achieve the above object, the signal transmission device provided by the present disclosure is applied to a smart TV which has a wireless signal module, and the signal transmission device includes:

a main antenna having a first signal input port, wherein the first signal input port is connected with the wireless signal module;

a transmission antenna adjacent to and spaced from the main antenna, wherein the transmission antenna has a signal output port; and a dead-zone compensating antenna having a second signal input port, wherein the second signal input port is connected with the signal output port through a signal transmission line;

the main antenna receives signals input by the wireless signal module and transmits the signals, the transmission antenna receives a part of the signals from the main antenna and transmits the part of the signals to a dead-zone compensating antenna through the signal transmission line; the dead-zone compensating antenna transmits the received signals and compensates a signal dead zone of the main antenna.

Optionally, the main antenna is disposed on a first dielectric substrate and the transmission antenna is disposed on a second dielectric substrate. In which, the first dielectric substrate and the second dielectric substrate are adjacent and faced; the main antenna is disposed on the first dielectric substrate having a first surface facing the second dielectric substrate, and the transmission antenna is disposed on the second dielectric substrate having a second surface facing the first dielectric substrate.

Optionally, the main antenna is faced to the transmission antenna, and a distance between the main antenna and the transmission antenna is no less than 1 mm and no more than 10 mm.

Optionally, the first dielectric substrate and the second dielectric substrate are both PCBs.

Optionally, the main antenna and the transmission antenna are both microstrip antennas.

Optionally, the main antenna is a linearly polarized antenna, and the transmission antenna is a circularly polarized antenna or a linearly polarized antenna.

or, the main antenna is a linearly polarized antenna, and the transmission antenna is a circularly polarized antenna or a linearly polarized antenna.

Optionally, the first dielectric substrate and the second dielectric substrate are both rectangular.

Optionally, the first dielectric substrate has a first feeding point and the second dielectric substrate has a second feeding point, in which the second feeding point is connected with the transmission line.

The present disclosure further provides a smart TV, which includes the signal transmission device. In which, the smart TV has a wireless signal module, and the signal transmission device includes:

a main antenna having a first signal input port, wherein the first signal input port is connected with the wireless signal module;

a transmission antenna adjacent to and spaced from the main antenna, wherein the transmission antenna has a signal output port; and a dead-zone compensating antenna having a second signal input port, wherein the second signal input port is connected with the signal output port through a signal transmission line;

the main antenna receives signals input by the wireless signal module and transmits the signals, the transmission antenna receives a part of the signals from the main antenna and transmits the part of the signals to a dead-zone compensating antenna through the signal transmission line; the dead-zone compensating antenna transmits the received signals and compensates a signal dead zone of the main antenna.

Optionally, the smart TV comprises a rear housing where the signal transmission device is disposed;

or, the smart TV defines a space for accommodating the signal transmission device.

According to the technical solution of the present disclosure, the wireless signal module in the smart TV is connected with the signal input port of the main antenna, and the signal from the wireless signal module are transmitted through the antenna. The main antenna receives and transmits the signal. The spaced arrangement of the main antenna and the transmission antenna enables air-fed transmission of the signal. Since the air-fed transmission will produce signal overflow, i.e. the signal cannot be completely transmitted to the transmission antenna. And a part of the signal from the main antenna is transmitted to the transmission antenna, and the rest is directly transmitted by the main antenna, covering the signal close to the main antenna. While the signal received by the transmission antenna is then transmitted to the dead-zone compensating antenna via the signal transmission line. The dead-zone compensating antenna transmits the received signals to cover the signals near the dead-zone compensating antenna. Since the dead-zone compensating antenna and the transmission antenna are connected by a transmission line, the position of the dead-zone compensating antenna can be freely adjusted, in order to completely cover the signals around the smart TV. As such, signal dead zones are avoided, and the problems have been resolved regarding connection and communication of the device, which provides convenience for the users.

BRIEF DESCRIPTION OF THE DRAWINGS

In order to explain the embodiment of the present disclosure or the technical solution of the prior art more clearly, the following will briefly introduce the drawings necessary in the description of the embodiments or the prior art. Obviously, the drawings in the following description are only some embodiments of the present disclosure. For those ordinary skill in the art, other drawings can be obtained according to the structure shown in these drawings without any creative effort.

ILLUSTRATION OF REFERENCE NUMERALS

TABLE 1

Figure 1:
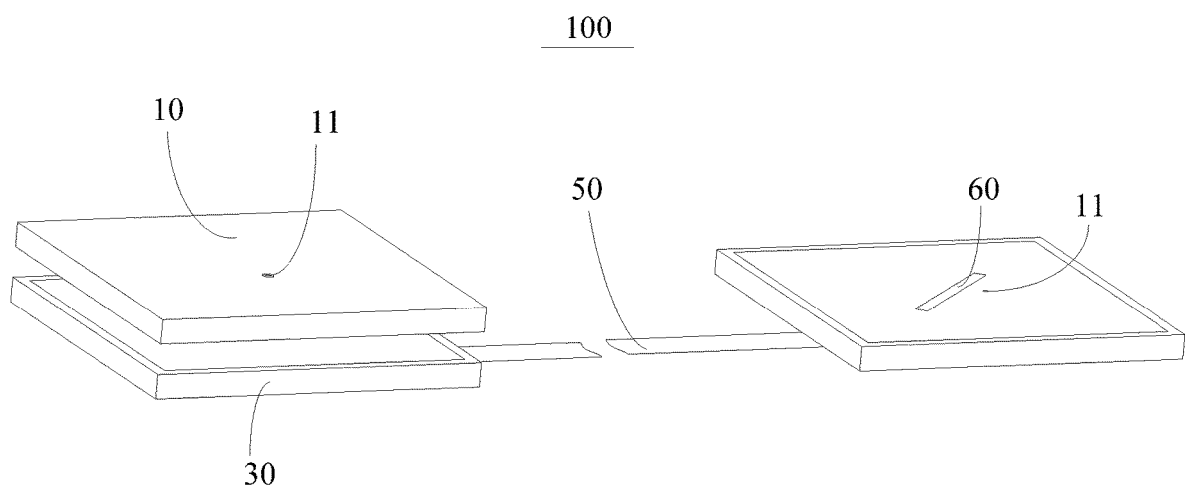
FIG. 1 is a schematic structural diagram of a signal transmission device according to an embodiment of the present disclosure.

| Reference Numeral | Name | Reference Numeral | Name |
|---|---|---|---|
| 100 | Signal transmission device | 10 | First dielectric substrate |
| 11 | Feeding point | 20 | Main antenna |
| 30 | Second dielectric substrate | 40 | Transmission antenna |
| 50 | Signal transmission line | 60 | Dead-zone compensating antenna |

The implementation, functional characteristics and advantages of the present disclosure will be further described with reference to the attached drawings in combination with embodiments.

DETAILED DESCRIPTION OF THE EMBODIMENTS

As following, the technical solution in the embodiments of the present disclosure will be described clearly and completely with reference to the drawings in the embodiment of the present disclosure. Obviously, the described embodiment is only a part of the embodiment of the present disclosure, not all of the embodiments. Based on the embodiments in the present disclosure, all other embodiments perceived by those ordinary skills in the art without creative effort should be fallen within the protection scope of the present disclosure.

It should be noted that all directional indicators (such as upper, lower, left, right, front, rear, etc.) in the embodiment of the present disclosure are only used to explain the relative positional relationship, movement, etc. between various components under a certain specific posture (as shown in the drawings). If the specific posture changes, the directional indicator will further change accordingly.

In the present disclosure, the terms "connected" and "fixed" etc. should be understood in a broad sense, otherwise specified and defined. For example, "fixed" can be a fixed connection, a detachable connection, or an forming a part integrally; it can be a mechanical connection or an electrical connection; it can be a direct connection or an indirect connection through an intermediate medium; and it can be the communication between interior of two elements or the interaction between two elements, otherwise specifically defined. For those ordinary skilled in the art, the specific meanings of the aforementioned terms in the present disclosure can be understood according to practical conditions.

In addition, the descriptions related to "first", "second" and the like in the present disclosure are for descriptive purposes only and cannot be understood as indicating or implying its relative importance or implicitly indicating a number of technical features indicated. Thus, features defining "first" and "second" may explicitly or implicitly include at least one of the features. In addition, the technical solutions between the various embodiments may be combined with each other, but must be based on what one of ordinary skill in the art can achieve. When the combination of technical solutions is contradictory or impossible to achieve, it should be considered that the combination of such technical solutions does not exist and is not within the protection scope required by the present disclosure.

The present disclosure provides a signal transmission device 100, which can realize a full coverage of signals.

Figure 2:
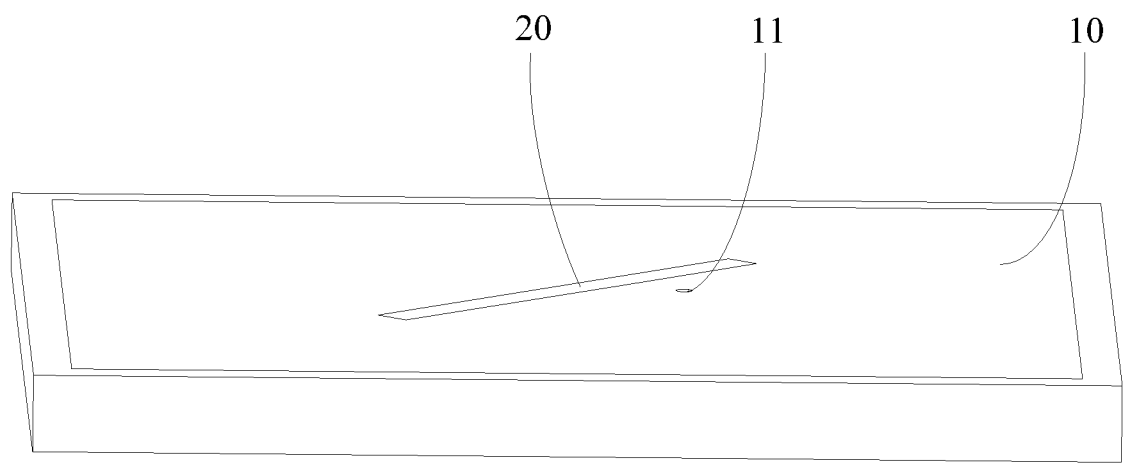
FIG. 2 is a schematic structural diagram of a main antenna according to an embodiment of the present disclosure.
Figure 3:
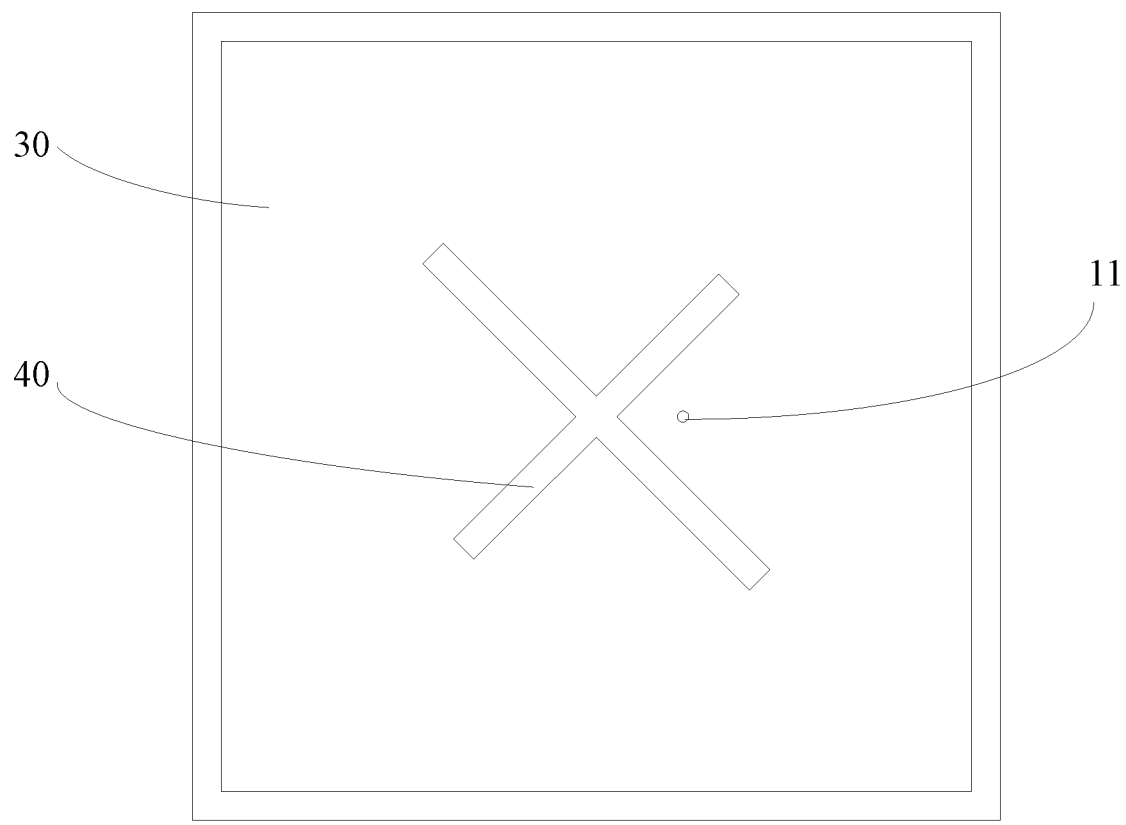
FIG. 3 is a schematic structural diagram of a transmission antenna according to an embodiment of the present disclosure.

In one embodiment of the present disclosure, the signal transmission device 100 is applied to a smart TV (not shown). The smart TV is provided with a wireless signal module. As shown in FIGS. 1 to 3, the signal transmission device 100 includes a main antenna 20, in which the main antenna 20 is provided with a first signal input port which is connected with the wireless signal module; a transmission antenna 40 adjacent to and spaced apart from the main antenna 20, in which the transmission antenna 40 is provided with a signal output port; and a dead-zone compensating antenna 60 which is provided with a second signal input port which is connected with the signal output port of the transmission antenna 40 through the signal transmission line 50. The main antenna 20 receives the signals input by the wireless signal module and transmits them to the outside. The transmission antenna 40 receives part of the signals of the main antenna and transmits the signals to the dead-zone compensating antenna 60 through the signal transmission line 50. The dead-zone compensating antenna 60 transmits the received signals to the outside to compensate the signal dead zone of the main antenna 20. The main antenna 20 receives signals input by the wireless signal module and transmits the signals, the transmission antenna 40 receives a part of the signals from the main antenna 20 and transmits the part of the signals to a dead-zone compensating antenna 60 through the signal transmission line; the dead-zone compensating antenna 60 transmits the received signals and compensates a signal dead zone of the main antenna 20.

According to the technical solution of the present disclosure, the wireless signal module in the smart TV is connected with the signal input port of the main antenna 20, and signals from the wireless signal module are transmitted through the antennas. The main antenna 20 receives and transmits the signals. The spaced arrangement of the main antenna 20 and the transmission antenna 40 enables air-fed transmission of the signals. Since the air-fed transmission will produce signal overflow, i.e. the signals cannot be completely transmitted to the transmission antenna 40. And a part of the signal from the main antenna 20 is transmitted to the transmission antenna 40, and the rest is directly transmitted by the main antenna 20, covering the signals close to the main antenna 20. While the signals received by the transmission antenna 40 is then transmitted to the dead-zone compensating antenna 60 via the signal transmission line 50. The dead-zone compensating antenna 60 transmits the received signals to cover the signals near the dead-zone compensating antenna 60. Since the dead-zone compensating antenna and the transmission antenna are connected by the transmission line 50, the position of the dead-zone compensating antenna 60 can be freely adjusted, in order to completely cover the signals around the smart TV. As such, signal dead zones are avoided, and the problems have been resolved regarding connection and communication of the device, which provides convenience for the users.

Further, as shown in FIG. 1, the main antenna 20 is provided on the first dielectric substrate 10, while the transmission antenna 40 is provided on the second dielectric substrate 30. The first dielectric substrate 10 and the second dielectric substrate 30 are adjacent and faced. The main antenna 20 is provided on a surface of the first dielectric substrate 10 facing the second dielectric substrate 30, and the transmission antenna 40 is provided on a surface of the second dielectric substrate 30 facing the first dielectric substrate 10. Since signals are transmitted from the main antenna 20 to the transmission antenna 40 in air-feeding transmission, the arrangement of the main antenna 20 on the first dielectric substrate 10 and the transmission antenna 40 on the second dielectric substrate 30, ensures antenna fixation and further the gap between the main antenna 20 and the transmission antenna 40. In some other embodiments of the present disclosure, the main antenna 20 and the transmission antenna 40 may be directly fixed by plastic screws, or the main antenna 20 and the transmission antenna 40 may be fixed on a cystosepiment.

Further, the main antenna 20 is faced to the transmission antenna 40, and the gap between the main antenna 20 and the transmission antenna 40 no less than 1 mm and no more than 10 mm. Such arrangement is to limit the amount of signals which are transmitted from the main antenna 20 to the transmission antenna 40. If the gap between the main antenna 20 and the transmission antenna 40 is rather small, the amount of signals transmitted from the main antenna 20 to the transmission antenna 40 is relatively excessed, and the signals directly transmitted from the main antenna 20 is too small in amount to cover the signal near the main antenna 20. Connection or communication problems induced by such arrangement may thus negatively affect the convenience of users. On the other hand, if the distance between the main antenna 20 and the transmission antenna 40 is rather large, the amount of signals transmitted from the main antenna 20 to the transmission antenna 40 is relatively few. The transmission antenna 40 is connected to the dead-zone compensating antenna 60 through the signal transmission line 50, through which the transmission antenna 40 transmits the received signal to the dead-zone compensating antenna 60. Since the amount of the signals received by the transmission antenna 40 is relatively few, the amount received by the dead-zone compensating antenna 60 would be rather few. Therefore, the amount of signals transmitted from the dead-zone compensating antenna 60 are too few to realize the signal coverage of the dead-zone compensating antenna 60. Connection or communication problems induced by such arrangement may further negatively affect the convenience for the users. Therefore, the distance between the main antenna 20 and the transmission antenna 40 in the present technical solution is chosen between 1 mm and 10 mm. And in present disclosure, the distance may be 1 mm, 2 mm, 3 mm, 4 mm, 5 mm, 6 mm, 7 mm, 8 mm, 9 mm or 10 mm.

Further, the first dielectric substrate 10 and the second dielectric substrate 30 are both PCBs. The main antenna 20 and the transmission antenna 40 can be directly printed on the surface of the PCB to for the convenience for the processing of antenna. And since the printed antenna is typically small in volume, the technical solution adopted in the present disclosure can further be applied when the space is relatively small. In some other embodiments of the present disclosure, the first dielectric substrate 10 and the second dielectric substrate 30 may be made of other materials.

Further, both the main antenna 20 and the transmission antenna 40 are microstrip antennas. The microstrip antenna is small in volume, light in weight and simple in manufacturing process, so the manufacturing of the main antenna 20 and the transmission antenna 40 can be facilitated. Further, the dead-zone compensating antenna 60 in the present disclosure may be a microstrip antenna or a common antenna. In FIG. 1, the dead-zone compensating antenna 60 is a linearly polarized microstrip antenna. In some other embodiments of the present disclosure, the main antenna 20 and the transmission antenna 40 may further be other antennas that can be arranged on a PCB and be capable of air feed transmission.

Further, as shown in FIGS. 2 and 3, the main antenna 20 is a circularly polarized antenna, and the transmission antenna 40 is a circularly polarized antenna or a linearly polarized antenna; or, the main antenna 20 is a linearly polarized antenna, and the transmission antenna 40 is a circularly polarized antenna or a linearly polarized antenna. Since both the linearly polarized antenna and the circularly polarized antenna can transmits signals in a specific direction, transmission of signals between the main antenna 20 and the transmission antenna 40 can be ensured.

Further, the first dielectric substrate 10 and the second dielectric substrate 30 are both rectangular. Such arrangement is easy for cutting and processing, and is further convenient for signal transmission.

Further, a feeding point is provided on each of the first dielectric substrate 10 and the second dielectric substrate 30. And the feeding points 11 of the second dielectric substrate 30 are connected to transmission lines, realizing the signal transmission through the connection with signal lines. The first dielectric substrate 10 is further provided with a signal transmission module with Bluetooth or WIFI, in order to be connected with the feeding point 11 and to receive signals transmitted from the feeding point 11.

The present disclosure further provides a smart TV, which includes a signal transmission device 100. In which, the smart TV is provided with a wireless signal module, and the signal transmission device 100 includes:

a main antenna 20 having a first signal input port, in which the first signal input port of the main antenna 20 is connected with the wireless signal module;

a transmission antenna 40 adjacent to and spaced apart from the main antenna 20, in which the transmission antenna 40 is provided with a signal output port;

a dead-zone compensating antenna 60 having a second signal input port, in which the second signal input port is connected with the signal output port through a signal transmission line 50.

The main antenna 20 receives signals input by the wireless signal module and transmits the signals, the transmission antenna 40 receives a part of the signals from the main antenna 20 and transmits the part of the signals to a dead-zone compensating antenna 60 through the signal transmission line; the dead-zone compensating antenna 60 transmits the received signals and compensates a signal dead zone of the main antenna 20.

In one embodiment, the wireless signal module is disposed on the first dielectric substrate 10, so as to be connected to the signal input port of the main antenna 20. In some other embodiments of the present disclosure, the wireless signal module may further be arranged inside the smart TV or on the housing of the smart TV.

In some embodiments, the smart TV is provided with a rear housing where the signal transmission device 100 can be provided. Since the front end of the smart TV is typically provided with a display device with little space, the signal transmission device 100 can be arranged on the rear housing. In some other embodiments of the present disclosure, the smart TV is provided with a space to accommodate the signal transmission device 100, so as to realize full coverage of signals for the convenience of users.

The description aforementioned is only the preferred embodiment of the present disclosure and is not intended to limit the scope of the present disclosure. Any equivalent structural modification made by using the description and drawings of the present disclosure or direct/indirect present disclosure in other related technical fields under the concept of the present disclosure shall be included in the protection scope of the present disclosure.

What is claimed is:

1. A signal transmission device applied to a smart TV, the smart TV comprising a wireless signal module, wherein the signal transmission device comprises:

a main antenna having a first signal input port, wherein the first signal input port is connected with the wireless signal module;

a transmission antenna adjacent to and spaced from the main antenna, wherein the transmission antenna has a signal output port; and a dead-zone compensating antenna having a second signal input port, wherein the second signal input port is connected with the signal output port through a signal transmission line, and wherein the main antenna is configured to receive signals input by the wireless signal module and transmit the signals;

the transmission antenna is configured to receive a part of the signals from the main antenna and transmit the part of the signals to the dead-zone compensating antenna through the signal transmission line;

the dead-zone compensating antenna is configured to transmit signals received from the transmission antenna and compensate a signal dead zone of the main antenna.

2. The device of claim 1, wherein the main antenna is disposed on a first dielectric substrate and the transmission antenna is disposed on a second dielectric substrate, and wherein the first dielectric substrate and the second dielectric substrate are adjacent and faced;

the main antenna is disposed on a first surface of the first dielectric substrate facing the second dielectric substrate;

the transmission antenna is disposed on a second surface of the second dielectric substrate facing the first dielectric substrate.

3. The signal transmission device of claim 2, wherein the first dielectric substrate and the second dielectric substrate are PCBs.

4. The signal transmission device of claim 3, wherein the first dielectric substrate and the second dielectric substrate are rectangular.

5. The signal transmission device according to claim 2, wherein the main antenna is faced to the transmission antenna, and a distance between the main antenna and the transmission antenna is no less than 1 mm and no more than 10 mm.

6. The signal transmission device of claim 5, wherein the first dielectric substrate and the second dielectric substrate are PCBs.

7. The signal transmission device of claim 6, wherein the first dielectric substrate and the second dielectric substrate are rectangular.

8. The signal transmission device of claim 2, wherein the first dielectric substrate defines a first feeding point;

the second dielectric substrate defines a second feeding point, and wherein the second feeding point is connected with the transmission line.

9. The signal transmission device of claim 1, wherein the main antenna and the transmission antenna are microstrip antennas.

10. The signal transmission device of claim 9, wherein the main antenna is a circularly polarized antenna, and the transmission antenna is a circularly polarized antenna or a linearly polarized antenna;

or, the main antenna is a linearly polarized antenna, and the transmission antenna is a circularly polarized antenna or a linearly polarized antenna.

11. A smart TV, comprising a signal transmission device having a wireless signal module, wherein the signal transmission device comprises:

a main antenna having a first signal input port, wherein the first signal input port is connected with the wireless signal module;

a transmission antenna adjacent to and spaced from the main antenna, wherein the transmission antenna has a signal output port; and a dead-zone compensating antenna having a second signal input port, wherein the second signal input port is connected with the signal output port through a signal transmission line;

the main antenna is configured to receive signals input by the wireless signal module and transmit the signals, the transmission antenna is configured to receive a part of the signals from the main antenna and transmit the part of the signals to the dead-zone compensating antenna through the signal transmission line; the dead-zone compensating antenna is configured to transmit signals received from the transmission antenna and compensate a signal dead zone of the main antenna.

12. The smart TV of claim 11, wherein
the main antenna is disposed on a first dielectric substrate and the transmission antenna is disposed on a second dielectric substrate, and wherein
the first dielectric substrate and the second dielectric substrate are adjacent and faced;
the main antenna is disposed on a first surface of the first dielectric substrate facing the second dielectric substrate;
the transmission antenna is disposed on a second surface of the second dielectric substrate facing the first dielectric substrate.

13. The signal transmission device of claim 12, wherein the first dielectric substrate and the second dielectric substrate are PCBs.

14. The smart TV of claim 12, wherein the main antenna is faced to the transmission antenna, and a distance between the main antenna and the transmission antenna is no less than 1 mm and no more than 10 mm.

15. The smart TV of claim 14, wherein the first dielectric substrate and the second dielectric substrate are PCBs.

16. The smart TV of claim 15, wherein the first dielectric substrate and the second dielectric substrate are rectangular.

17. The smart TV of claim 12, wherein
the first dielectric substrate defines a first feeding point;
the second dielectric substrate defines a second feeding point, and wherein the second feeding point is connected with the transmission line.

18. The smart TV of claim 11, wherein the main antenna and the transmission antenna are microstrip antennas.

19. The smart TV of claim 18, wherein the main antenna is a circularly polarized antenna, and the transmission antenna is a circularly polarized antenna or a linearly polarized antenna;
or, the main antenna is a linearly polarized antenna, and the transmission antenna is a circularly polarized antenna or a linearly polarized antenna.

* * * * *